(12) United States Patent
Moser et al.

(10) Patent No.: US 7,412,349 B2
(45) Date of Patent: Aug. 12, 2008

(54) INTERFACE FOR SERIES OF TESTS

(75) Inventors: Martin Moser, Speyer (DE); Stefan Fuchs, Wiesloch (DE)

(73) Assignee: SAP AG, Walldorf (DE)

( * ) Notice: Subject to any disclaimer, the term of this patent is extended or adjusted under 35 U.S.C. 154(b) by 23 days.

(21) Appl. No.: 11/298,960

(22) Filed: Dec. 9, 2005

(65) Prior Publication Data

US 2007/0136024 A1 Jun. 14, 2007

(51) Int. Cl.
*G06F 11/30* (2006.01)
(52) U.S. Cl. .................................... 702/182
(58) Field of Classification Search ............... 702/182, 702/92, 186; 700/92
See application file for complete search history.

(56) References Cited

U.S. PATENT DOCUMENTS

| | | | |
|---|---|---|---|
| 5,600,789 A | 2/1997 | Parker | |
| 5,903,278 A | 5/1999 | Mitchell et al. | |
| 5,991,897 A | 11/1999 | Perugini et al. | |
| 6,002,868 A | 12/1999 | Jenkins et al. | |
| 6,167,534 A | 12/2000 | Straathof et al. | |
| 6,199,077 B1 | 3/2001 | Inala et al. | |
| 6,202,199 B1 | 3/2001 | Wygodny et al. | |
| 6,463,552 B1 | 10/2002 | Jibbe | |
| 6,567,924 B1 | 5/2003 | McGee et al. | |
| 6,701,514 B1* | 3/2004 | Haswell et al. | 717/115 |
| 6,775,824 B1* | 8/2004 | Osborne et al. | 717/125 |
| 6,782,003 B1 | 8/2004 | Giroux et al. | |
| 6,799,213 B1* | 9/2004 | Zhao et al. | 709/224 |
| 6,823,460 B1 | 11/2004 | Hollander et al. | |
| 6,859,922 B1* | 2/2005 | Baker et al. | 717/125 |
| 2001/0005863 A1 | 6/2001 | Schreier et al. | |
| 2002/0078079 A1 | 6/2002 | Rangan et al. | |
| 2003/0126521 A1 | 7/2003 | Radestock | |
| 2004/0117376 A1 | 6/2004 | Lavin et al. | |
| 2004/0254881 A1 | 12/2004 | Kumar et al. | |
| 2005/0267711 A1* | 12/2005 | Butt et al. | 702/186 |

OTHER PUBLICATIONS

Mercury Loadrunner, Mercury Interactive Corporation, 2005. http://www.testingfaqs.org/t-load.html, Software Testing FAQ: Load and Performance Tools, pp. 1-16.

* cited by examiner

*Primary Examiner*—John E Barlow, Jr.
*Assistant Examiner*—Aditya S Bhat
(74) *Attorney, Agent, or Firm*—Mintz, Levin, Cohn, Ferris, Glovsky & Popeo, P.C.

(57) ABSTRACT

Methods and apparatus, including computer program products, for an interface that generates a report including a series of load test results. An interface can generate such a report that includes a series of load test results by initiating load testing of a first and second application during a first and second test run, and initiating combining of test results of the first and second test runs. The report can individually characterize the test results as members of a series of test runs. Load testing and combining of test results can be initiated at a single interface.

19 Claims, 4 Drawing Sheets

INTERFACE FOR SERIES OF TESTS

BACKGROUND

The present disclosure relates to data processing by digital computer, and more particularly to an interface for one or more series of tests.

In general, an application can have varying performance due to a number of factors. For example, applications that use a network, such as network-based applications, can have performance affected by network traffic, locked resources that need to be accessed often by many users, hardware limitations, and a limited allocation of network bandwidth. Load testing or performance regression of applications can be performed to determine performance bottlenecks. Load testing of, for example, network-based applications can involve testing the application with different loads of simulated transactions, simulated users, or both.

SUMMARY

The present disclosure provides methods and apparatus, including computer program products, that implement techniques for an interface that generates a report including a series of load test results.

In one general aspect, load tests and combining of results from the load tests can be initiated at an interface. In that aspect, initiating load tests includes initiating load testing of a first application during a first test run in accordance with a first definition of a first group of load tests and initiating load testing of a second application during a second test run in accordance with a second definition of a second group of load tests. Initiating combining of test results involves initiating combining of test results of the first and second test runs to generate a report. That report individually characterizes test results as members of a series of test runs that includes the first and second test runs. That aspect can be implemented as a computer program product embodied on tangible media that includes instructions that cause a data processing apparatus to initiate load tests and initiate combining of test results at the interface.

In another aspect, the computer program product can be a computer-implemented method. Similarly, computer systems are also described that can include a processor and a memory coupled to the processor. The memory may encode one or more programs that cause the processor to perform one or more of the operations described herein.

In another aspect, an interface initiates load testing of applications and initiates combining of test results. Applications are load tested during test runs in accordance with definitions of groups of load tests. A test result combiner combines test results of test runs to generate a report. That report individually characterizes the test results as members of a series of the test runs. The combining of test results involves test results from load testing initiated by the interface.

In another aspect, an apparatus (e.g., a test result combiner, as described below) is adapted to combine series of test results to generate a report that includes various tests results as a series of test results, where the test results in the series are individually characterized (e.g., for different versions of an application being tested, an indication of a version of the application that corresponds to test results, such as text or an icon, can be included in the report).

Implementations can include one or more of the following advantageous features in some variations. The generated report can incorporate details of the first and second test runs into the series of test runs. Also, the report can include a plotted graph that includes a trend line corresponding to a trend of a metric between the first test run and the second test run.

Initiating load testing of the first and second applications can include transmitting first data to initiate load testing of the first application and transmitting second data to initiate load testing of the second applications. The first and second data can be transmitted to a first node (e.g., a load testing tool or a component of an interface) to perform load testing of the first application. The interface can transmit third data to a second node (e.g., a component of the interface or a test result combiner that is external to the interface) to initiate the combining of the first and second test runs.

The interface can be an application that performs the load testing of the first and second applications. As another possibility, load testing of the first and second applications can be performed by an external tool.

First and second test results from the load testing of the first and second applications, respectively can be received and stored (e.g., by the interface).

The first and second applications can be the same application or different versions of a same application. The first and second applications can be load tested in different testing environments. Also, the first and second definitions of a group of load tests can be similar, and the first application can be load tested with a first load that can be of a different scale than a second load tested with the second application.

The report can include members of the series of test runs ordered chronologically, by version number of an application that is load tested, by magnitude (e.g., in order of lowest response time), or another scheme.

Load testing of applications can be initiated with one or more scenarios during a test run (e.g., a first test run). The interface can be displayed with graphical user interface components.

The interface can receive commands to initiate the load testing through a command line interface. A test result combiner can incorporate details of a first test run and a second test run into the series of test runs.

Generating a report that individually characterizes the test results can include collecting measurements of a similar metric from the test results (e.g., a response time metric for a same scenario); associating the measurements with details about a corresponding test run (e.g., associating a response time metric with a version number of an application); and generating the report such that the details of a corresponding test run are presented with associated measurements (e.g., data points in a chart are presented with the version number of the application).

The first definition of the first group of load tests can be received at the interface, where the first group of load tests includes load tests to perform on the first application. Likewise, the second definition of the second group of load tests can be received at the interface, where the second group of load tests includes load tests to perform on the second application.

The subject matter disclosed herein can be implemented to realize one or more of the following advantages. A report containing one or more series of load test results can be generated by a single interface. The report can include test results of different versions of an application, which can assist development by providing a unified interface for viewing and comparing test results to determine, for example, whether performance of an application has improved. Also, the report can assist in identifying whether aspects of an application no longer work properly since a prior version of the application was released. Test results can be evaluated in accordance with thresholds to determine if errors exist. Also, errors can be detected by reviewing testing log files (that do not necessarily contain measurements of key performance indicators, but, might contain information about operation of the testing environment). If errors are detected, a notification of an error can be automatically generated and a reporting notification, such as an electronic mail reporting the error, can be generated.

Generation of a series of load tests results can be automated. The automation can be implemented using an interface, where that interface provides a single arrangement from which load tests can be initiated, test results can be collected, and the test results can be combined to generate a report that shows the test results as a series of test runs. In addition to automating load testing and report generation, different versions of data used for load testing can be automatically switched out to reduce human interaction (e.g., switching data clusters). Moreover, installation and removal of different versions of a program being load tested can be automated. When implemented together, these automated features can provide a fully automated testing environment for different versions of an application that can be managed from a single interface. Advantageously, a single interface can ease management of testing by streamlining the different aspects of testing and combining them so that human interaction that might otherwise be required is reduced.

When an application is load tested, details of the application (but not the load test itself), such as a version number, release date, and names of software engineers responsible for the application; details about the testing environment (e.g., platform used for the application being load tested and test data); details about the test date and time; and details about the configuration for the test (e.g., configuration of the application and configuration of a load testing tool, such as the number of simulated users and scenarios selected) can be collected. This information can be associated with the test results such that some or all of it can be used to individually characterize a member of a series of test results in a report that includes test results from multiple test runs.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

A single interface can be used to generate a report that includes a series of load test results. In some of the following examples, an interface is described as an application; however, an interface can also be a graphical user interface, an application programming interface ("API"), and, as referred to in this description, is generally any type of interface that is a part of a design-time or run-time implementation.

Figure 1:
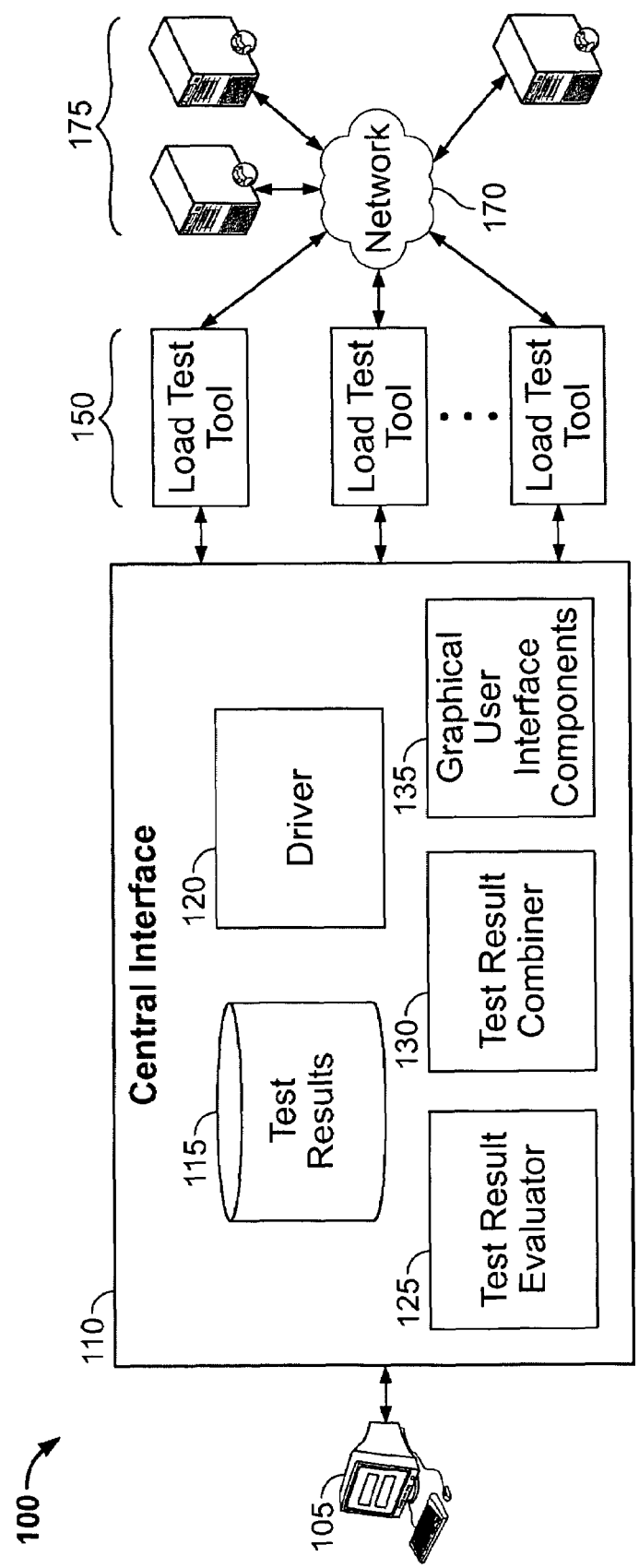
FIG. 1 is a diagram of a system in which load testing can be performed to generate a report that includes a series of load test results.

FIG. 1 is a diagram of a system 100 in which load testing can be performed to generate a report that includes a series of load test results. The system 100 includes user computer 105, central interface 110, load test tools 150, network 170, and web servers 175.

Load tests can be performed in the system 100 as follows. A user can interact with the user computer 105 to access the central interface 110. With the central interface 110, the user can define groups of tests to be performed. For example, the user can define a test scenario of transactions to load test for a web application (e.g., an application that is based on technologies that use the World Wide Web) that resides on one of the web servers 175. In response to user input (e.g., a click of a "start testing" button), the central interface 110 can initiate load tests by sending requests to start load tests, along with the definition of groups of tests to be performed, to the load test tools 150. The load test tools 150 can perform load tests on web-applications that reside on the web-servers 175 by sending web-based commands, such as HyperText Transport Protocol ("HTTP") commands, and by monitoring different performance metrics at the web servers 175 (e.g., monitoring the response time for a transaction). The load test tools 150 can collect test results and send them to the central interface 110, where they can be displayed to a user operating the user computer 105.

The central interface 110 is "central" in the sense that it includes a consolidated interface from which different functions related to load testing can be performed. The different functions of the central interface 110 include initiating load testing of applications, combining test results, evaluating test results, and maintaining a data repository of test results (e.g., a database of test results). Other implementations of an interface can perform fewer, additional, or different functions. For example, an interface can be minimized such that the functions include receiving definitions of groups of load tests, initiating load tests, and causing test results to be combined; however, the functions do not include combining test results or maintaining a data repository of test results.

The central interface 110 includes a data repository 115 storing test results, a driver 120, a test result evaluator 125, a test result combiner 130, and graphical user interface components 135. The data repository 115 stores test results from test runs that have-been performed. All of the test results need not be stored in the data repository 115, and some test results could reside outside of the data repository 115 (e.g., in a cache). The central interface 110 uses the data repository 115 of test results to store previous test results so the central interface 110 can retrieve them and combine test results to generate a report that includes a series of test results.

The driver 120 initiates load testing of applications by sending requests for different functions to be performed by the load test tools 150. The driver 120 can further interact with the load test tools 150 by receiving test results from the load test tools 150. As an example, the driver 120 could send a command with switches that list the location of a definition of load tests to be performed. In response to that command, the load test tools 150 can perform load tests in accordance with the definition provided and return results to the central interface 110 in the form of one or more files containing test results (e.g., measurements made). In some implementations, the test results could be in the form of database records stored in a database, or another form of storage.

The test result evaluator 125 analyzes test results received at the central interface 110 from the load test tools 150 and determines if the test results should be retained. For example, this can involve determining whether test results should be considered for review by a user prior to being stored in the data repository 115 or being deleted. In one example implementation, the test result evaluator 125 could review test results for anomalies and determine that an anomaly exists if a measurement is outside a range of generally accepted values (e.g., generally accepted values on a metric-by-metric basis, such as generally accepted values for processor performance and response time).

In some implementations the test result evaluator 125 can analyze results from components used by the central interface 110 to determine how the components are performing (e.g., by analyzing errors). As an example, the test result evaluator 125 could evaluate log files of the test tool 150 and web servers 175 and determine errors, type of errors, and severity of errors that occurred with the test tool 150 or web servers 175. As another example, the test result evaluator 125 could match errors reported by the test tool 150 and the web servers 175 with test results, allow for the test results to be filtered (e.g., by allowing a user to remove test results matched with certain errors), and report the errors with the test results (e.g., by having errors reported in a chart that includes test results, to reflect errors and their corresponding test results).

In some implementations, the test result evaluator 125 can include a notification feature that generates a notification of certain types of test results. For example, a notification feature could generate an electronic mail when anomalies have been determined to exist in test results (e.g., when one or more key performance indicators shows a significant regression compared to a previous test result from a previous version of an application). As another example, a notification feature could generate an electronic mail when certain types of errors have been determined to have occurred at the test tool 150 or web servers 175. The types of errors reported in a notification can be limited. For example, some errors logged by the web servers 175 can be considered errors that are desirable to have reported with test results (e.g., errors that tend to occur with load testing and are indicative of how the web servers 175 performed under a load) while others can be considered to require user intervention (e.g., an error that requires one of the web servers 175 to be restarted). A notification feature need not be limited to using electronic mail and any type of trigger can be used to generate a notification (e.g., need not be limited to test anomalies or errors, such as a notification triggered when all test results have been evaluated and are ready for user review). A notification feature need not be implemented in the test result evaluator 125. As examples, the central interface 110 can include a notification feature, or a notification feature can be implemented in a combination of the central interface 110 and the test evaluator 125 (e.g., a trigger from the test result evaluator 125 can cause the central interface 110 to generate a notification).

The test result combiner 130 can combine test results from multiple test runs to generate a report that includes at least some of the test results from each test run. For example, if the test results are in one or more files that include test results (e.g., nine files with various measurements), the files can be concatenated to generate a large file with all of the test results. The test results in the report can individually characterize the results from a test run as a member of a series of load tests. For example, a time metric for performing a scenario can be measured in a first test run and in a second test run, where each test run involves testing a different version of an application being tested. Then, the times measured during each test run can be plotted and version numbers corresponding to each of the measurements can be used to identify the measurements.

Although the series of test results might be chronological, the test results could be ordered differently. For example, the test results can be ordered by version number and the load tests for each version could have been performed out of order. As another example, the test results can be plotted in an order of magnitude (e.g., in the order of the quickest response time for a platform on which the web application runs).

The graphical user interface components 135 provide a user-friendly experience for the central interface 110. Any combination of components, such as buttons, lists, and the like, could be combined to provide a graphical user interface. In some implementations, the central interface 110 need not include graphical user interface components 135. For example, a command-line could be used to interact with a user.

As discussed above, load tests are performed by the load test tools 150. Although multiple load test tools 150 are shown, there could be a single load test tool for the central interface 110. The load test tools 150 are separate programs from the central interface 110. As discussed above, in some implementations they can be requested to start performing load tests by the driver 120 in response to a command that contains switches identifying details of a group of load tests to be performed. The load test tools 150 can perform load tests by generating a simulated load and measuring different types of metrics that relate to the performance of a web application that is under the simulated load. The metrics can include key performance indicators, such as response time and processor utilization. Loads can be generated by the load test tools 150 by simulating any number of users, transactions, or both. For example, a load test can be performed for a simulation of 100 users attempting to sign-on to a web-banking application. In that example, the amount of time it takes before a simulated user is signed-on and the amount of network bandwidth consumed, can be measured and relayed to the central interface 110.

The network 170 provides a link between the load test tools 150 and the web servers 175 that host web applications. The network 170 could be the Internet, an intranet, a point-to-point network, or any other type of network. In some implementations the network 170 need not be part of the test environment. For example, a web application could reside on the same server on which load test tools reside. In some implementations, functions of the central interface 110 could be located across a network. For example, the load test tools 150 could be accessed through an intranet by the central interface 110.

The web servers 175 host web applications. Each web server can include a different platform, such as a different software configuration (e.g., different operating system or web server software), hardware configuration, or both; or, the platforms can be the same. Versions of a same web based application can vary across the web servers 175. For example, one web server could host a version of an application without any bug patches and another web server could host a version of the same application with bug patches. Load testing different versions of the same application can be performed, and the results can be used to generate a report including a series of the test results, such that measurements of performance metrics can easily be compared across the different versions (e.g., by individually characterizing the test results). This can be advantageous, for example, when testing multiple implementations of a feature and performance of a web application is desired to be improved. Although in the example, different versions of an application are on different web servers, different versions of an application could be installed on a same web server over time. For example, for each release of a web application over a period of several years, load tests can be performed and the test results can be plotted such that a historical trend of performance can be derived.

Although the system 100 of FIG. 1 depicts certain components being part of the central interface 110 and certain components that are not part of the central interface 110, the components that are part of the central interface 110 can change. As an example, in some implementations, an interface can include a load test tool. In that example, the interface could be a single application with many functions integrated and streamlined together. This could enhance performance of the interface and make deployment of the interface easier. As another example, the data repository 115 for storing test results need not be part of the central interface 110 (e.g., test results could be stored in a database that is accessed through a network). In some implementations, many components can be distributed across multiple computers. For example, the central interface 110, the load test tool 150, the data repository 115, and the test result evaluator 125 can be separate programs, where each is located on a separate computer and the computers are connected by the network 170.

Figure 2:
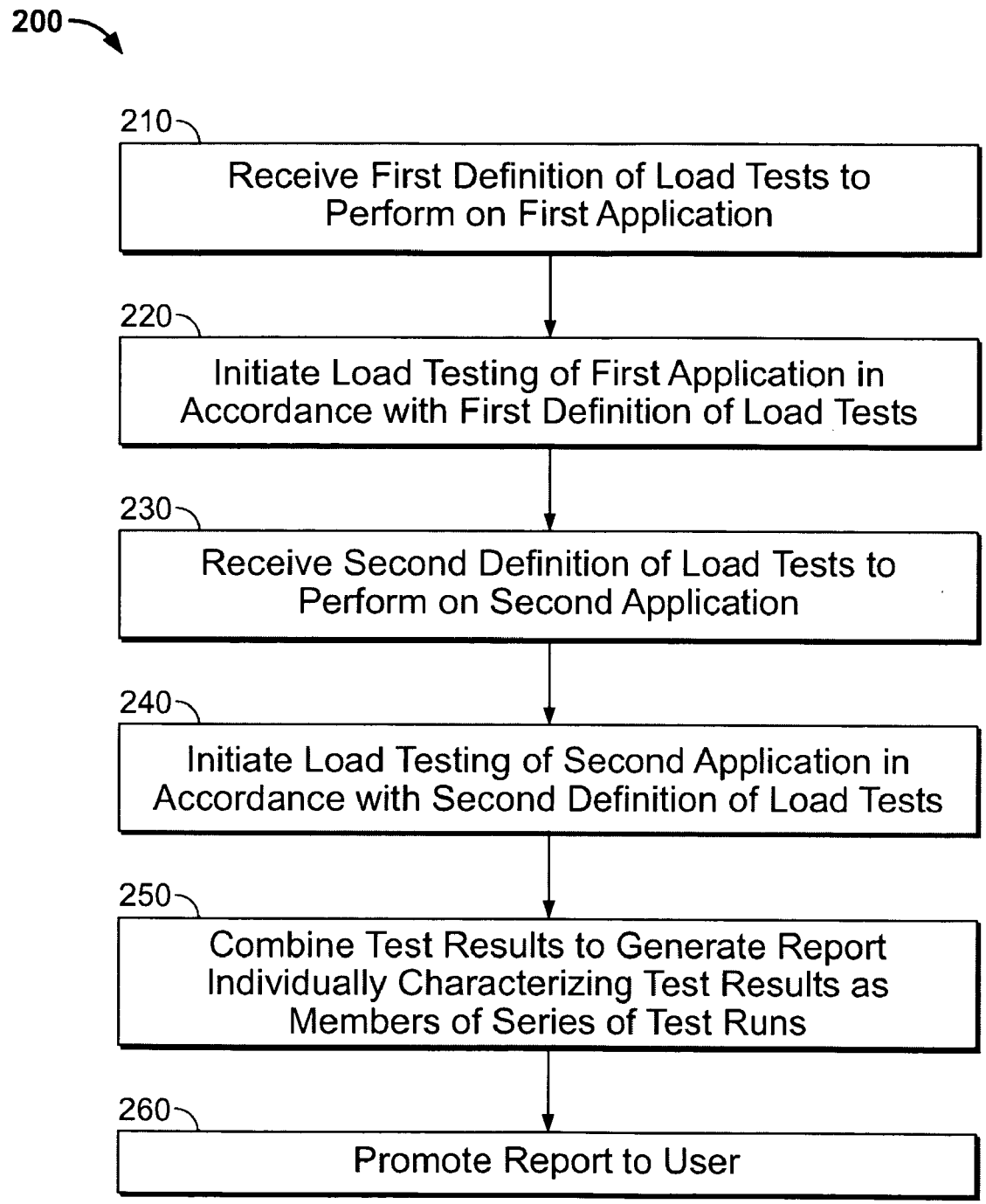
FIG. 2 is a flowchart illustrating a process of generating a report that includes a series of load test results.

FIG. 2 is a flowchart illustrating a process 200 of generating a report that includes a series of load test results. The process 200 involves load testing a first and a second application, which could be a same application, different applications, or different versions of a same application. Although the process 200 involves only two runs of load testing, more load testing can be performed and the test results can be combined to generate a report that has a larger series of test runs. The process 200 can be implemented in an interface, such as the central interface 110 of FIG. 1. Although the adjectives first and second are used throughout the process 200, they do not necessarily connote a relationship (e.g., a relationship in time).

At the beginning of the process 200, a first definition of load tests to perform on a first application is received (210). The definition can include, as examples, a list of scenarios to perform, a list of metrics to measure for the scenarios, and a description of loads to use when performing the load tests (e.g., 200 users for a first test, 1,000 users for a second test, and 10,000 users for a third test in a group of load tests). Receiving the definition can include receiving values from graphical user interface components (e.g., values representing a user selection of test scenarios). In some implementations, in addition to receiving the definition of load tests to perform, details about the load test can be received. For example, the date, time, name of an application to be tested, version number of the application to be tested, and platform on which the application will be tested can be received.

Load testing of the first application is initiated such that the load tests are performed in accordance with the first definition of load tests (220). Initiating load testing can include sending a command to a load test tool to commence load tests and sending the first definition of load tests.

In accordance with the process 200, a second definition of load test to perform on a second application is received (230), and load testing of the second application, in accordance with the second definition of load tests is performed (240). Load testing of the first and second applications can differ in various respects. For example, there might be no continuity between the load testing of each application, as, even if the first and second applications are the same, and the first and second definitions are the same, two groups of load tests are separately performed. For example, the load testing of each application can be referred to as occurring during a first run and a second run, where the two runs involve load testing of different groups of load tests. In some implementations, or in some load tests that are performed in some implementations, load testing can differ in time (e.g., load testing on different dates), place (e.g., load testing web applications on different computers), the applications can differ (e.g., two different versions of a same application), the testing environment can differ (e.g., different platform for a web server), and the like.

Test results of the load tests are combined to generate a report individually characterizing at least some of the test results as members of a series of test runs (250). The test results can be individually characterized such that they can be identified. For example, they can be identified by details about the test runs received at an earlier time. Those details can be included to identify, as examples, different points along a trend line (see, e.g., FIG. 4), different lines in a line graph, different sections of a pie chart, different bars in a bar graph, different lists of performance measurements, and the like. Combining the test results can involve aggregating lists of measurement values, selecting measurements that are desirable, combining database tables, and the like. Generating the report can involve selecting measurements that are desirable (e.g., by filtering measurements by a type of metric), plotting measurements in a chart, generating lists of measurements, and incorporating details about a test run in a plot or list of measurements.

A generated report can be promoted to a user (260). Promoting the report can include, as examples, generating a notification regarding the report (e.g., sending an electronic mail that has the report attached), displaying the report on a computer monitor (e.g., a window with a report containing a chart of measurements can be displayed to a user on a computer monitor), or generation of a data file.

Figure 3:
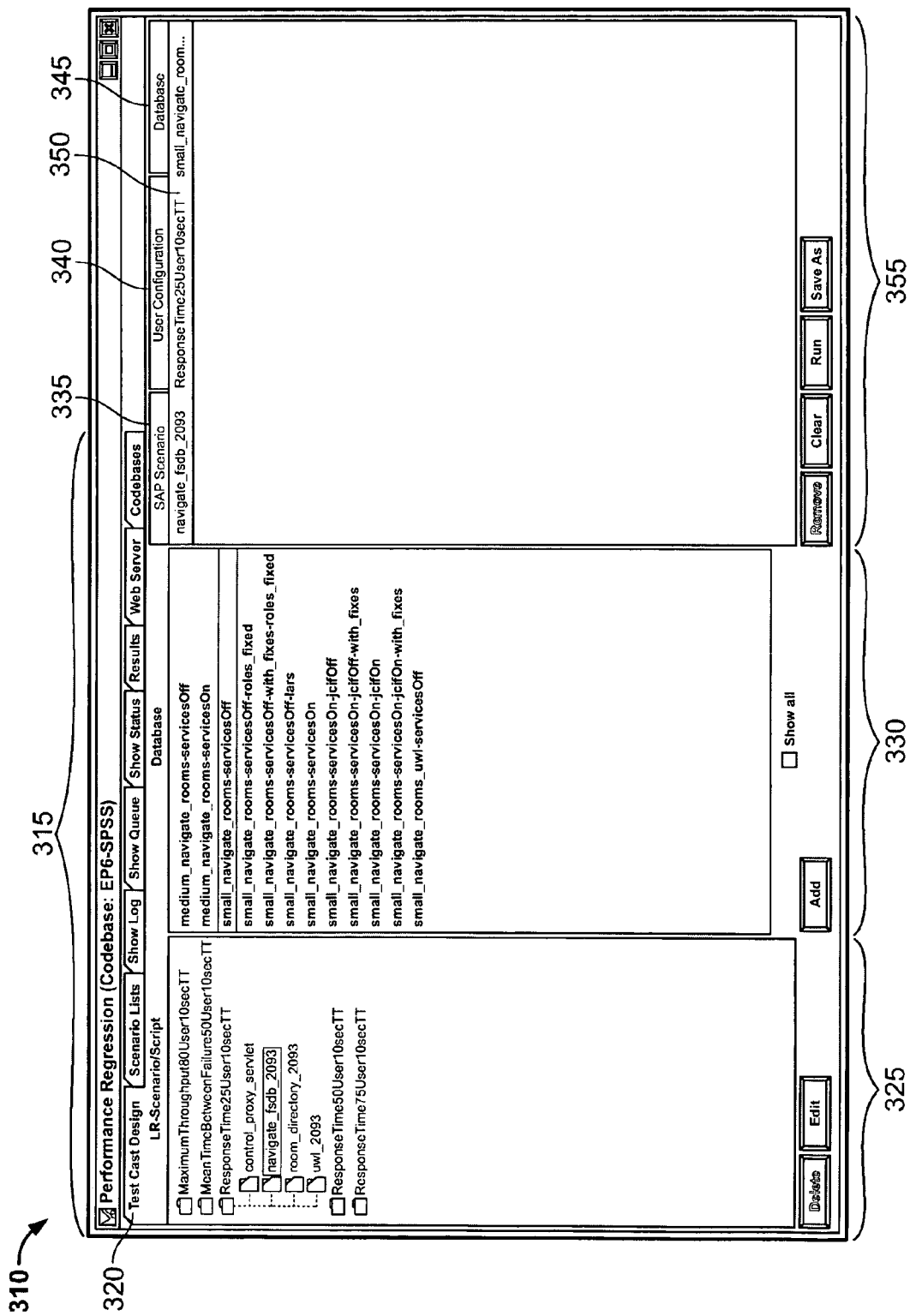
FIG. 3 is an illustration of an interface that can be used to generate a report that includes a series of load test results.

FIG. 3 is an illustration of an interface 300 that can be used to generate a report that includes a series of load test results. The interface 300 includes a main window 310. In the main window 310, a series of tabs 315 organize different aspects of the interface. In the "Test Case Design" tab 320, a test case (that can be used in a test run) can be designed. The test case is a definition of a test of an application to perform.

In the interface 300, a user can define the test case by selecting one or more scenarios from the list of scenarios 325 and a database from the list of databases 330 to use for a specific load test. Selecting a scenario can include selecting a list of actions to perform in a test case and a configuration of simulated users that perform the actions. For example, the columns SAP Scenario 335, User Configuration 340, and Database 345 define aspects of a test case for a load test 350, in the list of load tests 355, that could be performed in a test run. In the test case, the SAP Scenario 335 is a script describing actions (or transactions) simulated users execute and the User Configuration 340 defines a configuration of users in the test case (e.g., how many users will be used for load testing, what think times the users have, how users are ramped up, how long a test runs, and how users are ramped down).

In some implementations, in addition to, or instead of, configuring simulated users, other parameters for a testing environment can be configured through the interface 300. For example, heap size, cache size, application-specific settings (e.g., turning on or off a feature of an application being tested), and network bandwidth can be configured for an application being tested on a system being tested. Thus, test environment parameters that can be configured can include parameters for a system being tested, an application being tested, testing tools, or a scenario being tested.

Figure 4:
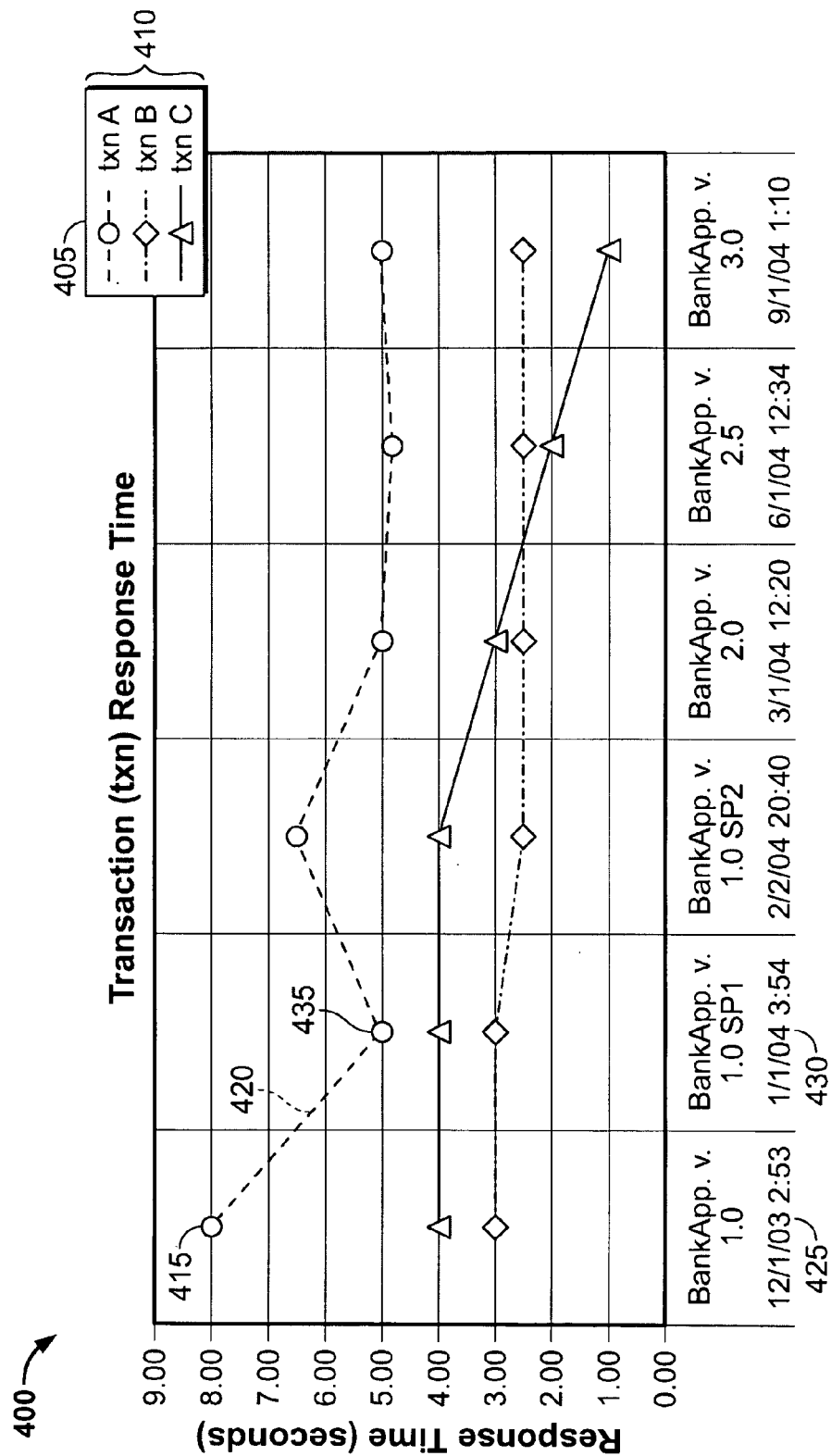
FIG. 4 is an illustration of a report including a series of load test results.

FIG. 4 is a diagram of a report 400 including a series of load test results. As indicated in the legend 405, the report includes a series of test results broken into different scenarios 410. Each portion of a series of test results for a scenario is represented by a different style of line. For example, the test results of the scenario txn A is represented by circular points, such as the circular point 415, and dotted lines, such as the line segment 420, that connect points. The metric measured for the different scenarios is the transaction response time. The metric was measured, for each scenario, across different versions of a same application, as indicated by the notation at the bottom of the chart. For example, box 425 indicates that the corresponding data points, such as the data point represented by dot 415, above the box 425 is related to "BankApp. v. 1.0", which might represent Bank Application, version 1.0. Also, box 430 indicates that the corresponding data points, such as the data point represented by dot 430, above the box 430 is related to "BankApp. v. 1.0 SPI," which might represent Bank Application, version 1.0, service pack 1. Although the report 400 illustrates a certain type of report, reports can vary. For example, although the test results displayed in the report 400 are ordered and scaled according to test runs, the test results could be scaled according to time. As other examples, pie charts, bar graphs, a list of test results, and the like could be used in a report.

Various implementations of the subject matter described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well;
for example, feedback provided to the user can be any form of sensory feedback (e.g., visual feedback, auditory feedback, or tactile feedback); and input from the user can be received in any form, including acoustic, speech, or tactile input.

The subject matter described herein can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although, the subject matter described herein has been described in terms of particular embodiments, other embodiments can be implemented and are within the scope of the following claims. For example, although implementations use web-applications as example applications being load tested, other types of applications or environments can be load tested. For example, load testing of a Java-based application using HTTP or an FTP (File Transfer Protocol) environment could be performed, or an application programming interface could be supported. For example, the operations can differ and still achieve desirable results. For example, the operations of the flowchart illustrated in FIG. 2 that include displaying the report to a user (260) need not be performed. In certain implementations, multitasking and parallel processing may be preferable. Other embodiments are within the scope of the following claims.

What is claimed is:

1. A computer program product embodied on computer readable media, the computer program product comprising instructions operable to cause data processing apparatus to:
   initiate, at an interface, load testing of a first application during a first test run in accordance with a first definition of a first group of load tests;
   initiate, at the interface, load testing of a second application during a second test run in accordance with a second definition of a second group of load tests; and
   initiate, at the interface, combining of test results of the first and second test runs to generate a report that individually characterizes at least some of the test results as members of a series of test runs, the series of test runs comprising the first and second test runs, the report comprising a plotted graph that includes a trend line corresponding to a trend of a metric between the first test run and the second test run, the metric being of a substantially same test case with a substantially same test configuration for each of the points of the trend line, the first and second applications being different builds of an application such that the trend line reflects performance changes across builds of the application across the first and second test runs, each of the first and second test runs being initiated independent of each other by a top-most parent test application in response to first and second user input to trigger the first and second test runs, respectively, where the first and second user input are separately entered from each other at separate times.

2. The computer program product of claim 1, wherein the instructions operable to generate a report individually characterizing at least some of the test results comprises:
   instructions operable to incorporate details of the first and second test runs into the series of test runs.

3. The computer program product of claim 1, wherein:
   the initiation of load testing of the first application comprises transmitting first data to initiate load testing of the first application, wherein the first data is transmitted to a first node to perform load testing of the first application;
   the initiation of load testing of the second application comprises transmitting second data to initiate load testing of the second application, wherein the second data is transmitted to the first node to perform load testing of the second application; and the interface transmits third data to a second node to initiate the combining of the first and second test runs.

4. The computer program product of claim 1, wherein the interface is an application that performs the load testing of the first and second applications.

5. The computer program product of claim 1, wherein the interface is an application and the load testing of the first and second applications is performed by an external tool.

6. The computer program product of claim 1 further comprising instruction operable to cause the data processing apparatus to:

receive first test results from the load testing of the first application;

store the first test results from the load testing of the first application;

receive second test results from the load testing of the second application; and store the second test results from the load testing of the second application.

7. The computer program product of claim 1, wherein: the first and second applications are the same.

8. The computer program product of claim 1, wherein: the first and second applications are different versions of a same application.

9. The computer program product of claim 1, wherein: the first and second applications are a same application, and the first and second applications are load tested in different testing environments.

10. The computer program product of claim 1, wherein:
the first and second definitions of a group of load tests are similar; and
the first application is load tested with a first load that is of a different scale than a second load tested with the second application.

11. The computer program product of claim 1, wherein generating the report individually characterizing at least some of the test results as members of a series of test runs comprises generating a report with the members of the series ordered chronologically.

12. The computer program product of claim 1, wherein initiating load testing of a first application during a first test run in accordance with a first definition of a first group of load tests comprises: initiating the load testing of the first application with one or more scenarios during the first test run.

13. The computer program product of claim 1, further comprising instructions operable to cause the data processing apparatus to:
display graphical user interface components of the interface.

14. The computer program product of claim 1, further comprising instructions operable to cause the data processing apparatus to:
receive at the interface commands to initiate the load testing of the first and second applications, wherein the interface is a command line interface.

15. The computer program product claim 1, wherein generating a report that individually characterizes at least some of the test results as members of a series of test runs comprises:
collecting measurements of a similar metric from the test results, associating the measurements with details about a corresponding test run, and
generating the report such that the details of a corresponding test run are presented with associated measurements.

16. An apparatus comprising: an interface operative to:
initiate load testing of applications during test runs in accordance with definitions of groups of load tests, and
initiate combining, at a test result combiner, of test results from load testing initiated by the interface; and
the test result combiner operative to combine test results of a plurality of the test runs to generate a report individually characterizing the test results as members of a series of the test runs, the report comprising a clotted graph that includes a trend line corresponding to a trend of a metric between a first test run and a second test run of a respective first and second application, the metric being of a substantially same test case with a substantially same test configuration for each point of the trend line, the first and second applications being different builds of an application such that the trend line reflects performance changes across builds of the application across the first and second test runs, each of the first and second test runs being initiated independent of each other by a topmost parent test application in response to first and second user input to trigger the first and second test runs, respectively, where the first and second user input are separately entered from each other at separate times.

17. The apparatus of claim 16, wherein the test result combiner is operative to incorporate details of a first test run and a second test run into the series of test runs.

18. A computer-implemented method comprising:
initiating, at an interface, load testing of a first application during a first test run in accordance with a first definition of a first group of load tests;
initiating, at the interface, load testing of a second application during a second test run in accordance with a second definition of a second group of load tests; and
initiating, at the interface, combining of test results of the first and second test runs to generate a report individually characterizing at least some of the test results as members of a series of test runs, the series of test runs comprising the first and second test runs, the report comprising a plotted graph that includes a trend line corresponding to a trend of a metric between the first test run and the second test run, the metric being of a substantially same test case with a substantially same test configuration for each point of the trend line, the first and second applications being different builds of an application such that the trend line reflects performance changes across builds of the application across the first and second test runs, each of the first and second test runs being initiated independent of each other by a topmost parent test application in response to first and second user input to trigger the first and second test runs, respectively, where the first and second user input are separately entered from each other at separate times.

19. The method of claim 18, wherein individually characterizing at least some of the test results as members of a series of test runs comprises:
incorporating details of the first and second test runs into the series of test runs.

* * * * *